F. E. BUXTON.
JOURNAL BEARING.
APPLICATION FILED MAR. 16, 1914.

1,260,635.

Patented Mar. 26, 1918.

6 SHEETS—SHEET 1.

WITNESSES:

INVENTOR.

F. E. BUXTON.
JOURNAL BEARING.
APPLICATION FILED MAR. 16, 1914.
1,260,635.
Patented Mar. 26, 1918.
6 SHEETS—SHEET 2.
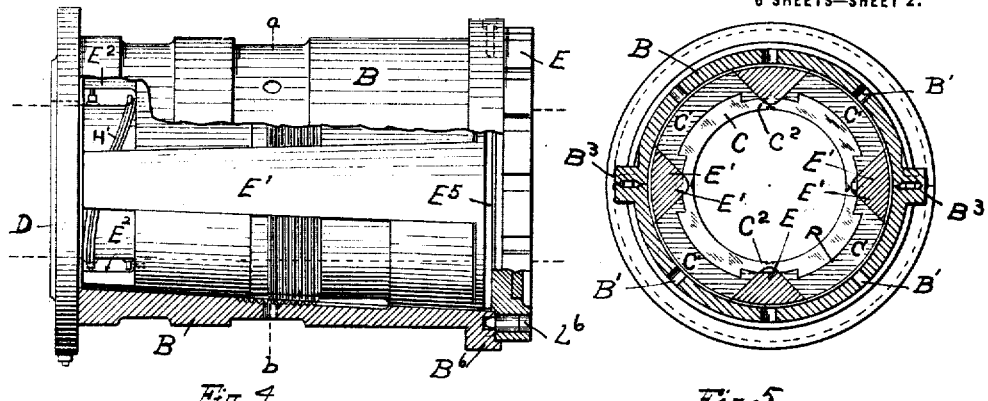
Fig. 4                Fig. 5
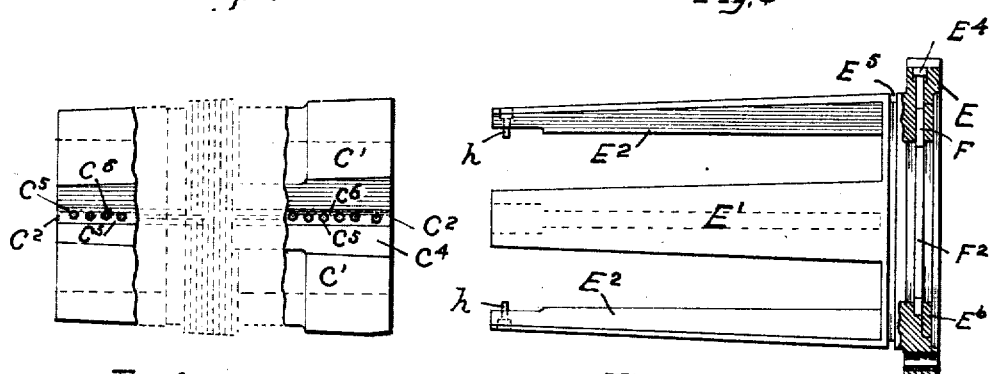
Fig. 6                Fig. 7
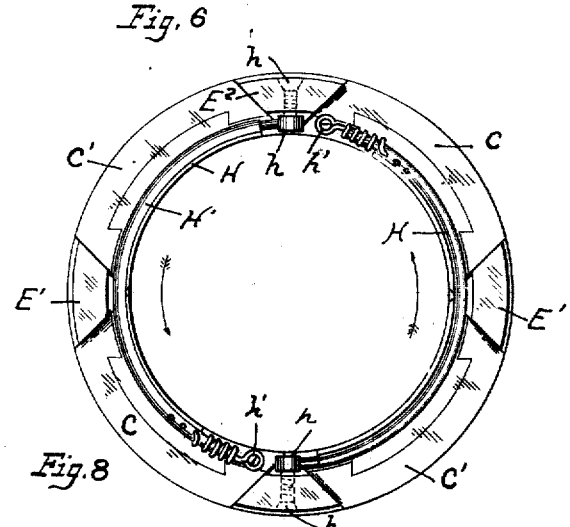
Fig. 8
WITNESSES:
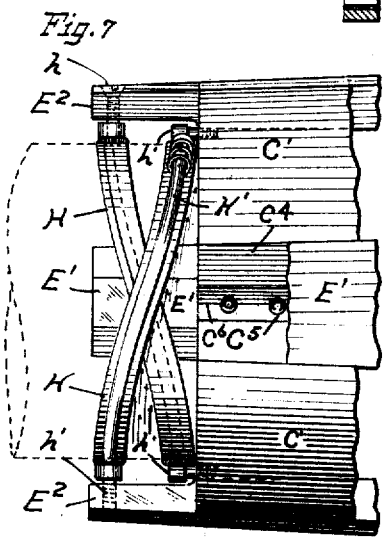
Fig. 9        INVENTOR.

F. E. BUXTON.
JOURNAL BEARING.
APPLICATION FILED MAR. 16, 1914.

1,260,635.  Patented Mar. 26, 1918.
6 SHEETS—SHEET 6.

WITNESSES:  INVENTOR.

UNITED STATES PATENT OFFICE.

FRANCIS E. BUXTON, OF INDIANAPOLIS, INDIANA.

JOURNAL-BEARING.

1,260,635.  Specification of Letters Patent.  Patented Mar. 26, 1918.

Application filed March 16, 1914. Serial No. 825,015.

*To all whom it may concern:*

Be it known that I, FRANCIS E. BUXTON, a citizen of the United States, residing in the city of Indianapolis, in the county of Marion and State of Indiana, have invented certain new and useful Improvements in Journal-Bearings.

My present invention has special reference to wear compensating bearings including lubricating and locking means. The object broadly stated is to perfect and secure the much desired realization of radial wear-compensation, in the most simple manner, and to also provide a construction to greatly reduce the initial cost of bearings in general.

Specifically stated my invention relates to the improvement of the bearing-sleeve element, which I simplify by a series of removable grids mounted on a tubular like bearing lining, having a series of intermediate weakened portions disposed thereon.

My invention also relates to the mechanism surrounding the bearing-sleeve, for reliably supporting and maintaining the proper inner diameter of the bearing for exact alinement. Another feature of my invention relates to the improved mechanism for holding a proper head of oil, and distributing the same throughout the bearing. And still another feature of the invention consists on the mechanism for securely locking and releasing the bearing.

Figure 1:
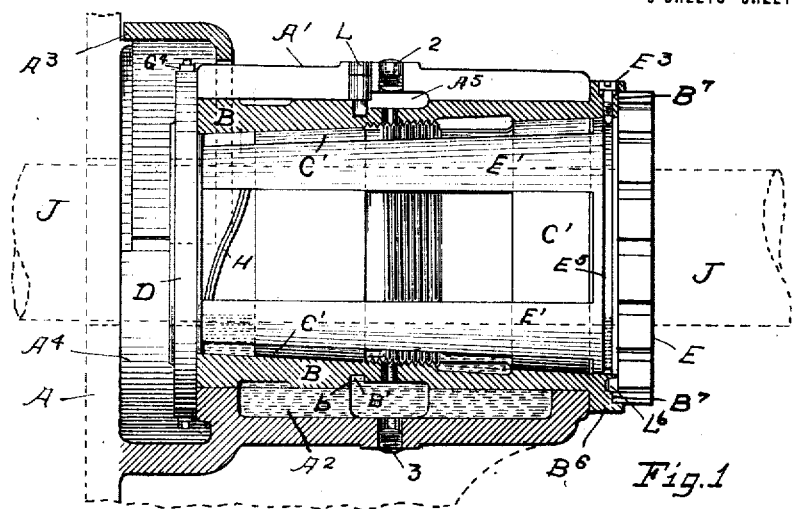
Figure 2:
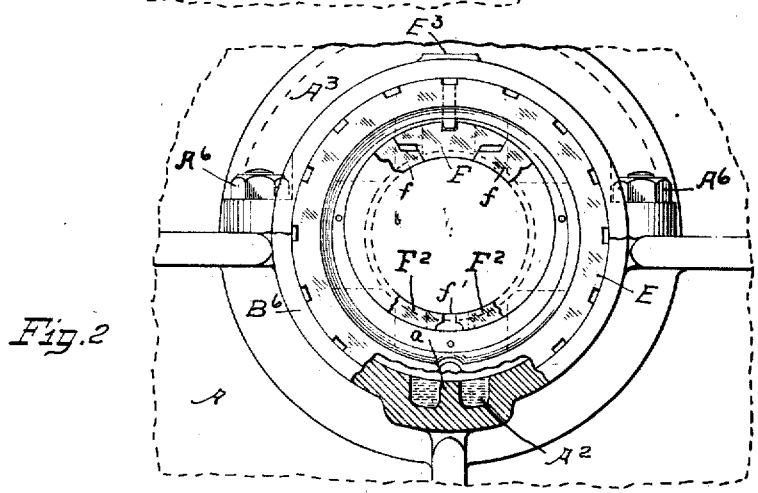
Figure 3:
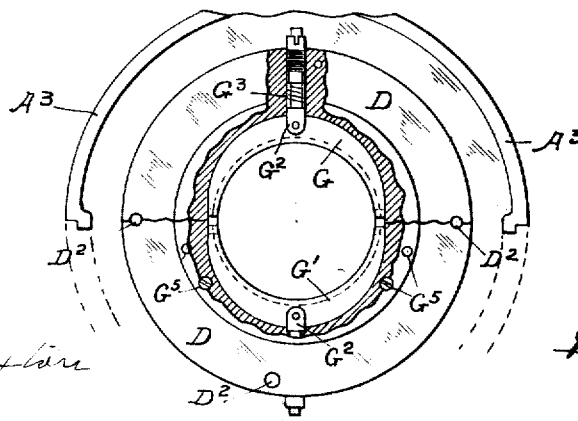
Figure 10:
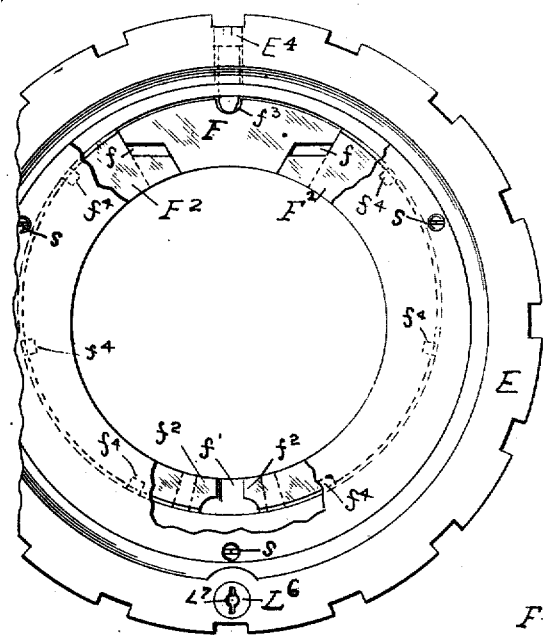
Figure 11:
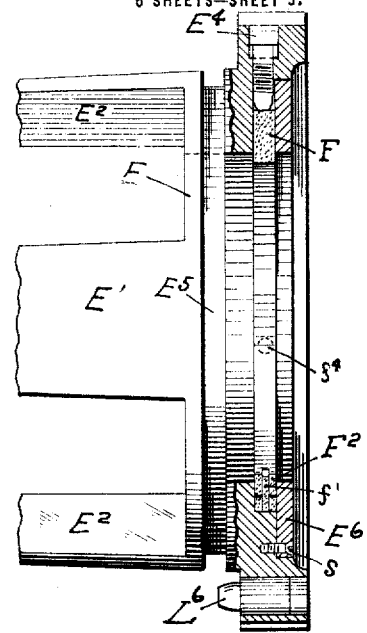
Figure 12:
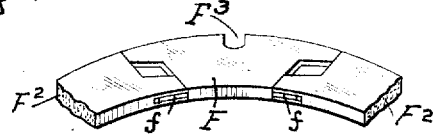
Figure 13:
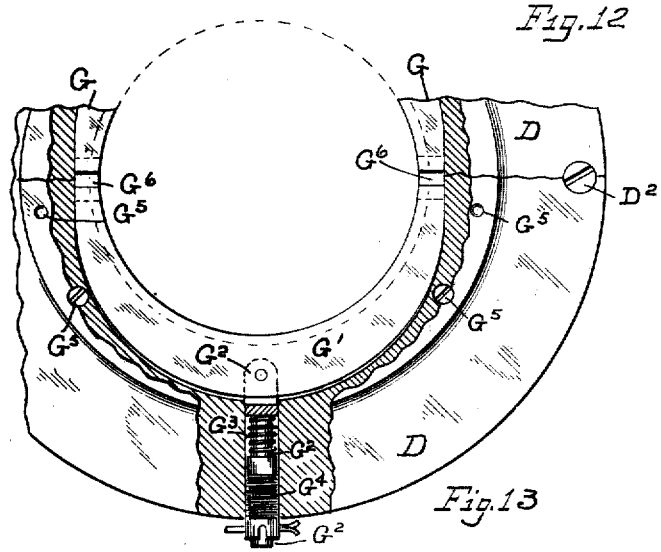
Figure 14:
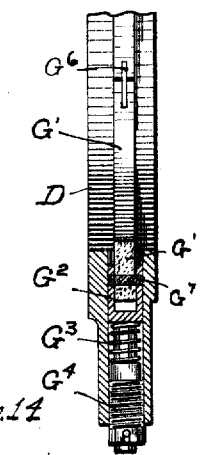
Figure 15:
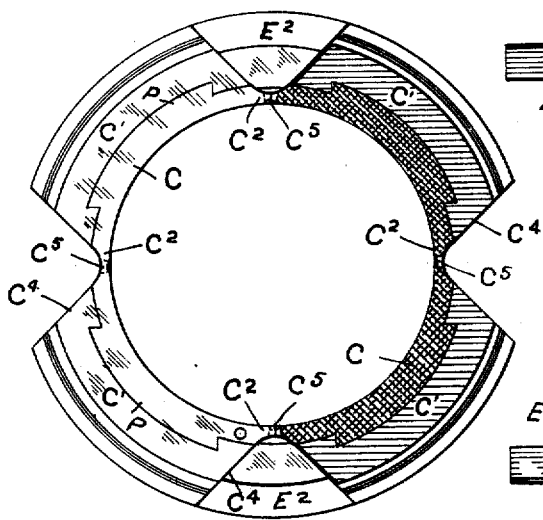
Figure 16:
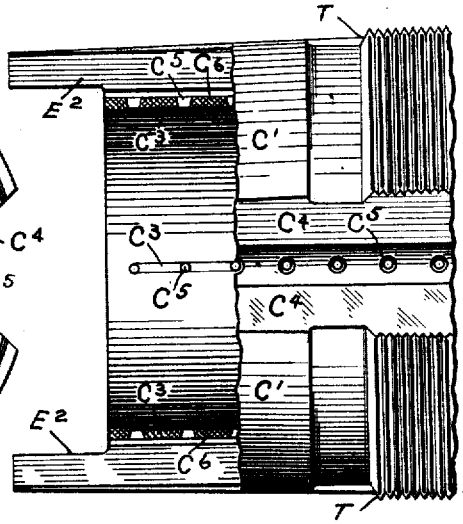
Figure 17:
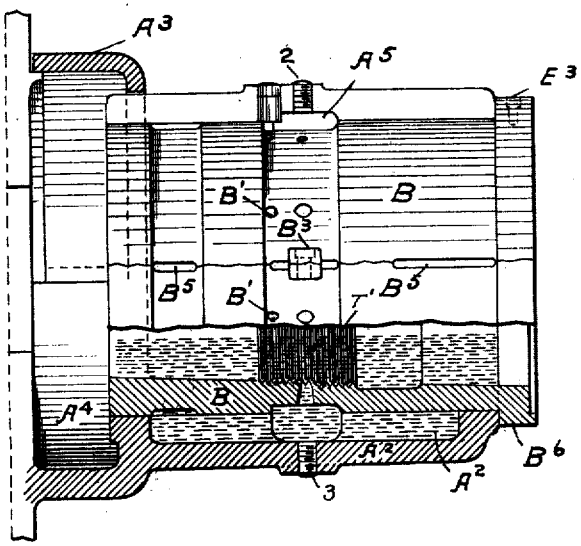
Figure 18:
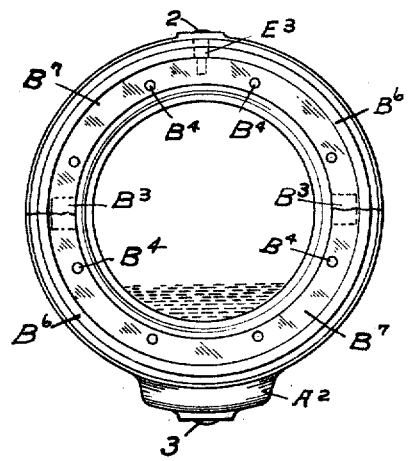

In the drawings and specification other features will be brought out and explained. As shown in the drawings, Figure 1 is a side elevation of the bearing, certain parts thereof being shown in central section, to illustrate the bearing rotor mechanism. Fig. 2 is a front end elevation of the same, certain parts being broken away to show the oil-ring portions and lower part of the chamber. Fig. 3 is an end elevation of the rear collar certain parts being broken away and in section to show the mounted gripping-ring. Fig. 4 is a side elevation of the complete bearing it being removed from the casing and having portions broken away to show the bearing-sleeve and cage. Fig. 5 is a central sectional view, taken on line *a—b* of Fig. 4, but as having been given a ⅛ turn relative to Figs. 1 and 2. Fig. 6 is a side elevation in detail of the bearing-sleeve, the solid line portions showing the improved groove, base and one of the perforated sections. Fig. 7 is a side elevation in detail of the bearing sleeve cage, the flange portion in section to show the oil ring device. Fig. 8, is an enlarged rear end portion of the bearing and cage device in elevation, showing the manner of attaching the oil-controlling links. Fig. 9 is a side elevation of the same, having a portion of the cage bar removed, to show the bearing-sleeve groove and perforations. Fig. 10, is an enlarged front end elevation of the cage, and having certain portions broken away to illustrate the manner of pinning the oilring-segmnts. Fig. 11, is a side elevation of the cage having the bars broken away, and the flange portion shown in central section for the same purpose. Fig. 12, is a perspective view showing the manner of assembling the oil-ring segments with their alining key. Figs. 13, and 14, are enlarged end and side elevation, they being broken portions of the rear stationary collar, having certain portions removed and shown in central section, to illustrate the mounted gripping oil-ring. Fig. 15, shows an enlarged end elevation partly in section as looking from the rear or reduced end of the bearing and cage device, to show more clearly the several removable grids as mounted. Fig. 16, is a broken detail portion of the same, partly in central longitudinal section, and side elevation, having a cage bar removed, to further show the compressible feature of the bearing-sleeve. Fig. 17, is a side elevation in detail of the casing and mounted sleeve, having the lower portion of the casing and sleeve broken away and shown in central section to illustrate the oil chamber. Fig. 18, is shown a front elevation of the same detail, showing the manner of attaching one to the other.

Figure 19:
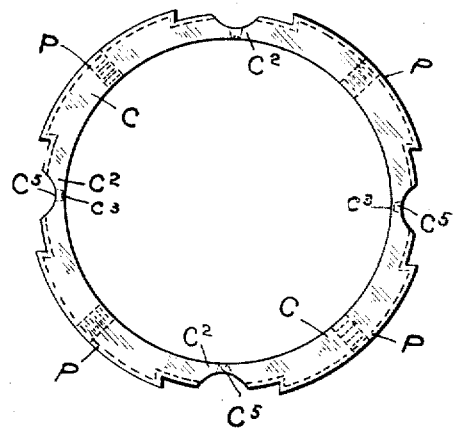
Figure 20:
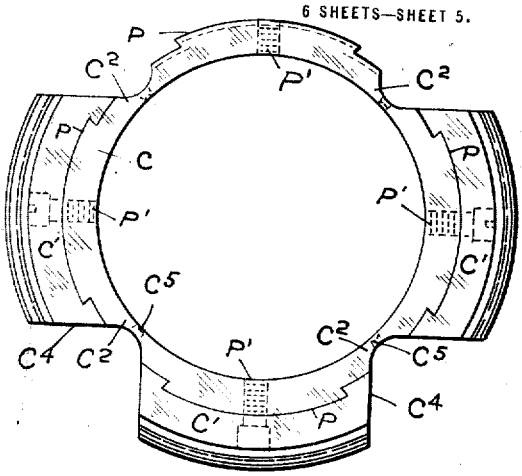
Figure 21:
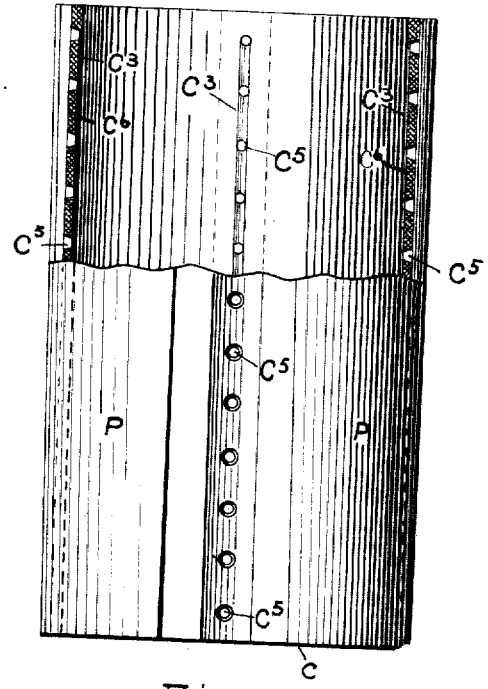
Figure 22:
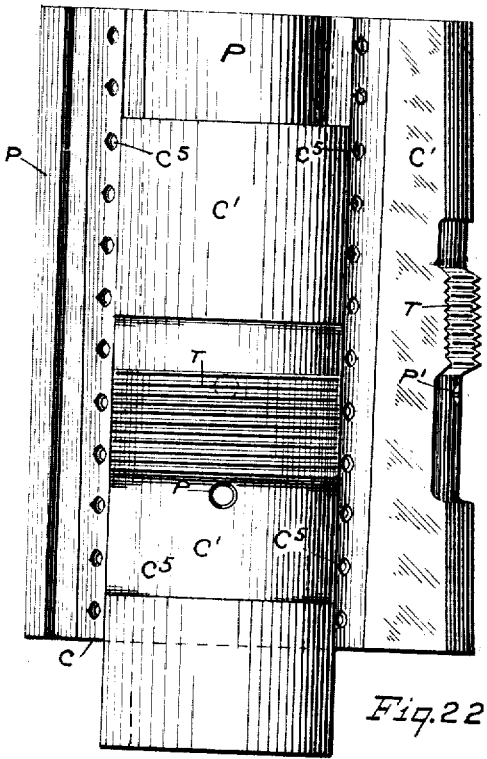

In Figs. 19 and 20, are shown in detail rear end elevations of the bearing-sleeve lining, also the manner of mounting the grids and securing them in position. Fig. 21, is a vertical elevation of the bearing-sleeve lining, having the upper portion broken away and shown in central section to illustrate the general construction. Fig. 22, illustrating in the same manner the mounted grids, the one being partially removed to show their removability.

Figure 23:
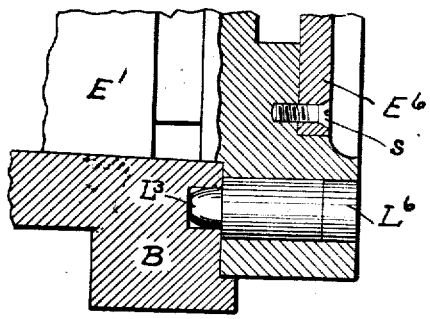
Figure 24:
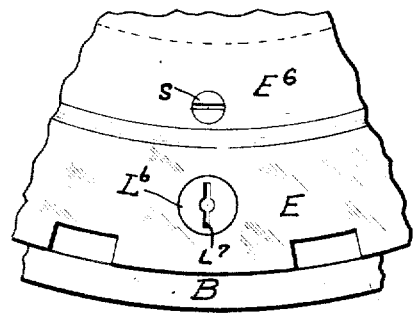
Figure 25:
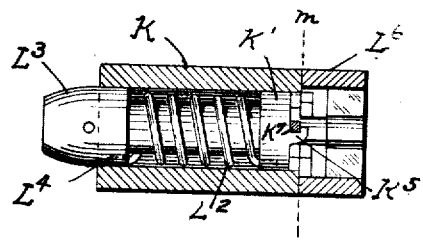
Figure 26:
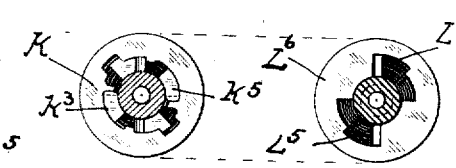
Figure 27:
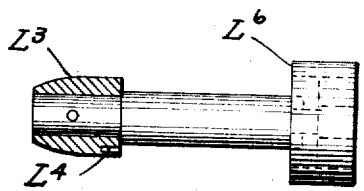
Figure 28:
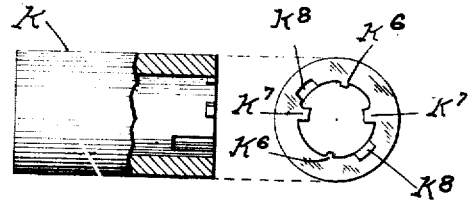
Figure 29:
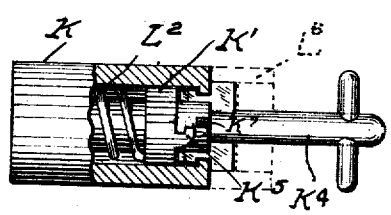
Figure 30:
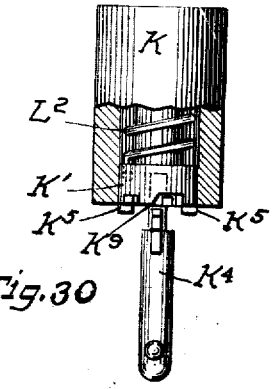
Figure 31:
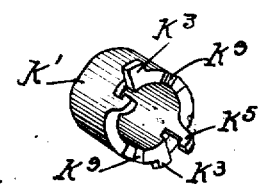

In Figs. 23 and 24, are shown in much enlarged views broken portions of the sleeve and cage flanges, the former being in central section showing the lock-pin device. Fig. 25, is a much larger view of the complete lock-pin, shown partly in central longitudinal section. Fig. 26, is a cross section of the lock-pin, looking to the left from line m—n of Fig. 25. Fig. 26' is a cross section of the locking-pin, looking to the right from line m—n of Fig. 25. Figs. 27, 28, 29, and 30 are detailed parts and portions showing the construction of the lock-pin. Fig. 31, a perspective detail view of the lock-ring portion.

For the purpose of simplicity I will divide up the description of the said journal-bearing into the several heads, and describe them in the order named: casing and sleeve devices, lubricating devices and locking devices.

*Casing and sleeve devices.*—The bearing proper is provided with a suitable fixed outer casing A, which may be of any approved kind, but preferred and shown in the drawings as having a fixed but removable cap. Within the said casing is mounted a revoluble sleeve B, as indicated in Fig. 1, said sleeve being shown carrying a flange $B^6$, that overhangs the front end of the casing A, and permanently secured longitudinally by the lock-pin L, carried by the said casing, by registering against the annular shoulder on B at $b$. Near the base of the said shoulder are positioned and spaced a plurality of pin holes B' extending radially inward that are to receive the said lock-pin when it is desired to lock the sleeve B, circumferentially within the casing. The rear collar D, is provided primarily to close the end of the casing, but it is formed in a manner to be centrally located within the end of the sleeve B, and if desired it may be secured to the several cage bars directly adjacent which will be described presently. However in the present instance it is secured to the casing by cap-screws $D^2$.

The sleeve B, is preferably formed in equal longitudinal sections and is securably pinned together and secured by screws $B^5$, see Fig. 17. The flanged end $B^6$ of the sleeve B, has a shallow annular recess $B^7$ formed thereon, and a plurality of spaced apart holes $B^4$, to receive the said lock-pin hereinafter described.

The interior of the mounted sleeve is now described. (The details relating to its interior construction have been shown and described in detail, it being the subject matter of Letters-Patent issued to me, Serial No. 1,109,642, September 1, 1914.) Briefly stated, the conical interior of the sleeve B, is likewise provided with a central threaded portion and for the same purpose, but in my present improvement the sleeve B, is longitudinally fixed within the casing A, as shown. As previously mentioned I have added to the said sleeve a flanged portion $B^6$, for the reason that it may be mounted within any suitable casing wherein the complete bearing may be employed.

Referring to Figs. 1, 2 and 17, I have shown a chamber $A^2$ situated directly under the bearing and connected to this chamber is an auxiliary chamber $A^4$, it being vertically disposed, and by reason of its engaging hood portion $A^3$ it completely encircles the rear end of the bearing. Both chambers form an integral part of the casing, and their office will be described in turn.

*Wear-compensating devices.*—The bearing lining proper C, is in the form of a cylindrical tube, it being of the proper diameter and length (see Figs. 19 and 21,) and having a plurality of thickened wedge portions P, formed radially on its outer surface, and extending thereon its full length. Between each of the said wedge portions is disposed a semi-circular groove $C^2$. and at the vertex of the same are disposed a series of perforations $C^5$, that extend radially through the said reduced portions of the bearing lining. At the vertex of the said perforations a plurality of shallow connecting channels $C^8$, are formed, that connect each series of perforations into straight clearance channels, for a reason hereinafter described.

There are to be mounted over the several wedge portions P, of the said lining, a plurality of lobe like grids C', which precisely fill the circumferential space intermediate between each two longitudinal grooves $C^2$.

The said bearing-lining in the present instance is made in the form of a unit, and from any suitable bearing metal that may be die cast. However by the said process the lining if desired may be formed in companion longitudinal sections, the parting to be made intermediate between the said wedge portions. As previously mentioned said wedge portions positioned on the bearing-lining are formed in a manner to dovetail a plurality of grid portions C', which have been machine formed and of the proper length thereof. The said grids have parallel side margins and are preferably made of steel, in this form they are removably secured to the said lining by suitable screws P'. The unit device is now in the form to be reinforced by its accompanying cage portion and together machine formed to their proper dimensions.

The bearing-sleeve formed in this manner provides a construction wherein not an ounce of dead weight lies on the supported journal.

The inner surface or wall of the said device is unbroken, in order to provide means whereby a continuous film of oil may be retained therein, thereby reducing the objectional co-efficient of friction to a minimum. I attain and maintain this most desirable result, by combining the following device. E is a cage it being provided to engage support and control the inner positioned bearing-sleeve device as described. Referring to Figs. 5 and 7, it consists of a plain ring or flange portion, which in the present instance is preferred, but if desired it may be formed in companion or separable portions.

In the present instance, said flange has an annular clearance opening slightly larger than the journal to be carried, on the inner surface of the said flange is provided a reduced portion forming a groove $E^5$, as in Fig. 1, and adjacent the said groove are positioned a plurality of spaced apart bars $E^1$ and $E^2$, and in the present instance and preferably said bars are cast integral with the flange portion, but if desired they can be so formed and secured by other means permanently to the flange. In the present device there are four bars, to correspond to an equal number of right-angular flaring grooves positioned between the bearing-sleeve grids $C'$, said bars in the present instance being formed longer than the bearing-sleeve to be supported, the purpose of which will be presently described, and of a form to precisely fit and slide into the already described grooves $C^4$, disposed on the bearing-sleeve. The said cage is now placed around the bearing-sleeve, and constitutes practically one device, the cage bars occupying the several spaces not filled by the bearing-sleeve.

The said device is now machine formed in a manner to fit into the tapered sleeve B, as described. Threads are also formed on the longitudinal center portion of the said grids, in a manner to engage the companion threads, disposed within the wall of the said sleeve. An eccentric recess is formed on the inner margin and extending outwardly on the face of the flange E, the purpose of which will be hereinafter described.

The bearing-mechanism is now mounted within the sleeve B, and by turning the cage E, the threaded portion of the said sleeve causes the bearing mechanism to be drawn within the flanged recess on B at $B^7$, which acts as a stop to fix the longitudinal position of the said cage. The lock screw $E^3$, carried by the flange $B^6$, is now adjusted within the groove $E^5$, to secure its position as described.

The rear stationary collar D, is now placed in position over the journal J, it being centered within the end of the sleeve B, as before described by a projecting shoulder formed on its inner face, and secured to the casing by screws $D^2$. The portion of the flange E that projects beyond the sleeve flange $B^6$, is formed in a manner to apply a suitable spanner. The bore of the bearing-sleeve C is made a fraction larger than the journal carried, and therefore by turning the cage E slightly to the right with the spanner, radial adjustment of the bearing-sleeve is provided by reason of the reduced portions $C^2$, of the sleeve-lining at the said point being compressed, and at the same time as before mentioned the said bearing-sleeve is drawn slightly backward by its thread engagement within the reverse conical like sleeve, there being an annular space provided within the rear end of the said sleeve primarily for that purpose.

It is also evident that a reverse action of the spanner will cause the said bearing-sleeve to expand as it is caused to travel toward the front. It should be clear also that by locking the cage E, by lock-pin $L^6$, and releasing the casing lock at L, and by again applying the spanner as in the first instance, the complete bearing mechanism may be turned in either direction, thereby providing circumferential adjustment. Therefore it should be manifest that I have provided a unitary bearing construction absolutely substantial, but yielding to the means supplied for varying the inner diameter of its journal opening. Again referring to the bearing-sleeve grids, it should be understood that the same are not intended to be replaced as their office is only as a supporting device for the said bearing lining, which after continued use may be removed and quickly replaced by an exact duplicate lining as shown, thereby avoiding the loss of time and needless expense.

*Lubricating devices.*—The oil chamber as has been mentioned is in fact the part of the casing not occupied by the bearing. The main oil settling chamber $A^2$, carries a rib portion $a$, it being a necessary support for the above positioned sleeve B. The central portion of said rib is removed to form a passage that communicates with a transverse annular passage $A^3$ formed in the casing thereof.

As heretofore mentioned the open ends of the sleeve B are closed in a normal manner by removable attached collars D and E.

In the present drawings two forms of oil-ring devices are shown, and each form is applied in a position requiring their dissimilar construction. Referring to Figs. 10, 11, and 12 formed on the front face of the cage flange E, and extending radially from the journal opening, I have formed an eccentric recess, into which are positioned a plurality of curved segment portions $F^2$ and also the key F, their inner sides engaging with the journal J thereof.

The upper and lower ends of the said curved segments are slotted in order to engage the web portions $f$ and $f'$. The webs are formed integral with the said key, connecting the uppermost ends of the device as shown. An annular recess is formed in the said cage flange registering with the face of said oil-ring into which a ring flange $E^6$, is positioned and securely attached for the purpose required. The said oil-ring is adjusted in this way—a screw $E^4$ is carried by the flange portion E, that engages with the slot F³, provided in the key F, therefore it is evident that by tightening the said screw, the worn surface of the oil-ring will allow of the necessary contraction that is required. The ring segments are preferably formed of wood fiber. Mounted within the rear collar D, is shown a modified form of the oil-ring device, it comprises a plurality of oppositely disposed curved segments G and G', mounted within a vertically positioned oblong slot formed within the said collar opening, the said curved segments are mounted on suitable rod portions, that are slidably carried by the said collar. The said rod portions are reduced at their extreme ends G², and carry a suitable spring G³, that is in turn compressed by a screw nut G⁴, which tends to force the said curved segments together in a manner to adjust the same when required. The reduced ends of the said segments are slotted in a manner to receive web-portions G⁶ as shown.

Referring to Fig. 4, an annular space is shown projecting back, and adjacent the bearing-sleeve. Positioned in this space are a pair of spiral links H and H' see Figs. 8 and 9. The said links are mounted spirally around the journal J, and are detachably attached at their one ends, to the projecting ends of the cage bars E², by suitable screws h, while their other ends of the said link are provided with spring portions h', and securably attached to the bearing-sleeve. As indicated in the drawings, the said links are attached in a manner to act in coöperation with the revolving journal J.

The office of the said device is this—as the oil is carried up by the journal, a much larger quantity is lifted by the exposed section of the journal than is carried elsewhere.

Therefore this extra volume (indicated by the arrows) is thrown over toward the bearing-sleeve openings by reason of contact with the links, and by gravity is filtered through the openings C⁵, into the bearing as desired. The said links are formed from a suitable ductile alloy, that will readily conform to the curvature of the journal, and to these are secured a slidable base of leather.

It should be observed, that as the bearing-sleeve travels back slightly, by reason of being adjusted radially, the pitch of the links will be likewise decreased, but provision has been made in the length of the space for their operation, whereby no interference will need to occur. It should be evident that in an oil tight chamber as shown and described, a sufficient head of oil is carried and maintained, above the lower line of the journal. Therefore in the most simple manner the clean top portion of the oil is distributed throughout the bearing without splash or agitation.

In this mechanism I have in a great measure used only the elements that are otherwise necessary, in their place, to attain the desideratum, thereby preserving a continuous film of oil in an unobstructed bearing surface.

*The lock-pin device.*—This is considered as being an essential part of the invention, and the same is used as a means to prevent other, than the operator to disturb the adjustment of the bearing. The device may be used to lock the sleeve B, in its initial position also to lock the bearing-cage mechanism after it has been adjusted radially. To mount the lock-pin in its position, and to operate requires only a round hole of a proper size to be formed in the part to be locked. It consists of a round cylindrical sleeve, of which a portion, is a part of the reduced pin mounted within. To describe briefly, (see Figs. 25 and 28 wherein is shown the main sleeve portion K, which carries a slidable pin portion L⁶). The locking-ring K¹ with its attached spring L², is mounted over the reduced end of the pin L⁶.

The device now being complete, it is entered into the said casing. The lock-lugs K³ register within the slots K⁸, provided within the wall of the casing as indicated. A pin nipple L⁸, is now placed over the reduced end of said pin, in a manner to secure both the nipple and spring. The lock-pin is now complete.

To operate it should be seen that by placing the key K⁴ in its seat, the lock-ring may be turned slightly to the left, thereby releasing the said lock-ring. The key may then be turned in the opposite direction, and thereby engage the portion L⁵, releasing the said pin portion to be withdrawn. And by allowing the key to be carried back and removed the said spring will force the pin portion to return in its former position.

I have claimed in previous applications those inventions and features of inventions which are basic, and subsequently are shown and described unavoidably herein, but are not herein claimed.

Moreover it is manifest that the present invention in many of its devices is not limited to a fixed casing employed as a journal bearing, but can be employed in various combinations and not depart from the spirit of the invention.

What I believe to be new and desire to secure by Letters Patent is—

1. In a device of the character described, a support for a journal, a removable lining device disposed around the journal, a plurality of devices disposed around the said removable lining in a manner to support the same, and a device arranged to act to position and primarily support the said devices substantially as described.

2. A journal support comprising a removable lining disposed around the journal, a plurality of removable grids spaced around the said lining in such manner as to support the same, means adapted to position and permanently support the said parts, and a sleeve disposed around the said parts to support the same substantially as indicated.

3. A journal support comprising a removable lining disposed around the journal and having a plurality of wedge-like portions spaced thereon, a plurality of detachable grids arranged around on the lining in a position to support the same, a cage comprising a plurality of bars positioned to act in connection with the grids to space the grids apart, and a sleeve having a flange portion disposed around said grids and bars to control and support the same in operative position, substantially as set forth.

4. In a device of the character described, comprising a removable tubular lining to surround a shaft, a plurality of spaced apart grids detachably disposed around the lining, a cage having a flanged portion, bars projecting from said flange portion and adapted to fit between said grids, and a separable inclosing sleeve affording means for supporting and controlling the said grids and cage.

5. In combination with a journal, a compressible lining disposed around the journal and having a plurality of spaced apart longitudinally extending grooves disposed therearound, a plurality of intermediate grids carried by the lining in a manner such as to support the same, a cage device formed in a manner to interlock between the said grids and control the circumferential movement thereof, and a sleeve comprising an overhanging flange portion to provide means whereby the said devices are contained and supported.

6. In a device for supporting a journal, a compressible and expandible sleeve lining disposed around the journal, a plurality of removable grids having channels formed on their interiors in a manner to allow them to slide over the several compressible portions disposed around the lining, screws to secure the grids in position, means to regulate and control the movements of the several devices, an outer positioned sleeve surrounding said parts, and means for supporting the entire device, substantially as shown.

7. In a device for supporting a journal, comprising a compressible sleeve disposed around in contact with the journal and having a plurality of longitudinal perforated grooved portions disposed therearound, a cage formed to interlock over the said sleeve to afford means to control the movements thereof, an inclosing sleeve adapted to support said compressible sleeve and cage, an outer casing, and means for closing the rear end of the supports and casing.

8. In a device for supporting a journal, a removable sleeve disposed around the journal and having an exterior thread engaging portion on its periphery, a cage interlocking with the spaces in the sleeve, a flange portion formed to engage a wrench whereby said sleeve may be rotated, an inclosing sleeve interiorly threaded to engage with the threaded portion of the sleeve in order to provide radial adjustment, a casing in which the said supporting means is inclosed, and means for locking said mechanism in adjusted position.

9. A journal support comprising a compressible lining adapted to fit around a shaft, a plurality of grids detachably mounted on the periphery of the lining and extending parallel therewith, the lining being weakened between each two of the said grids and having perforations formed through the weakened portion of the lining, all substantially as shown and described.

10. A journal bearing comprising, in combination with a journal, a lining located around the journal, a cage, a plurality of grids disposed around the lining and supported and properly positioned by said cage, and a sleeve located around said parts and retaining them into a unitary structure capable of being compressed upon the journal.

FRANCIS E. BUXTON.

Witnesses:
J. R. BENNETT,
S. H. THOMSON.